M. W. KIDDER.
PROCESS FOR MANUFACTURING COAL-GAS.
No. 173,730. Patented Feb. 22, 1876.
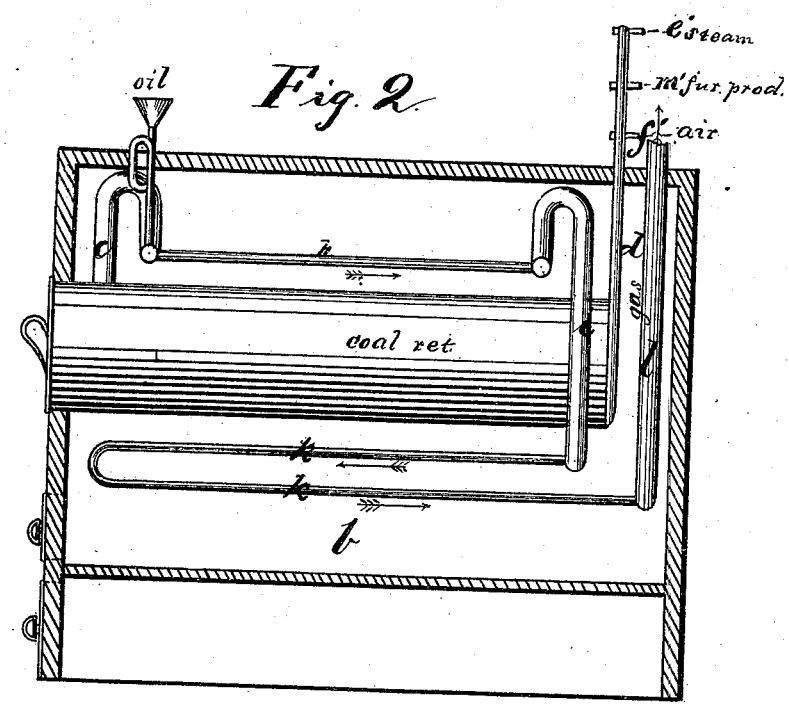
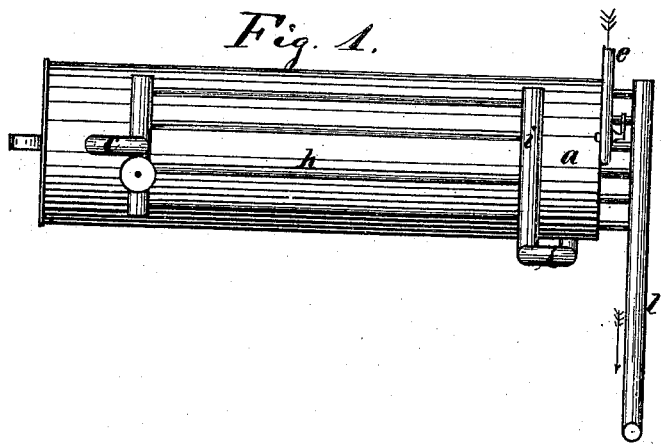
WITNESSES:
John K. Heard.
Pirson Noyes
INVENTOR:
Moses W. Kidder
by Alban Andrin att 2 Sheets—Sheet 2.
M. W. KIDDER.
PROCESS FOR MANUFACTURING COAL-GAS.
No. 173,730. Patented Feb. 22, 1876.
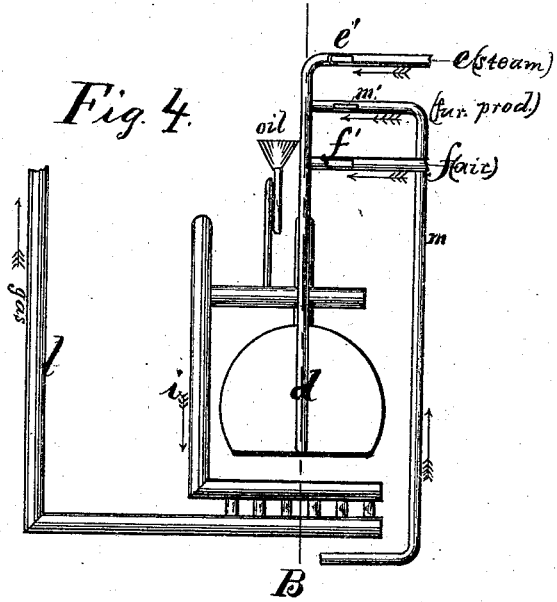
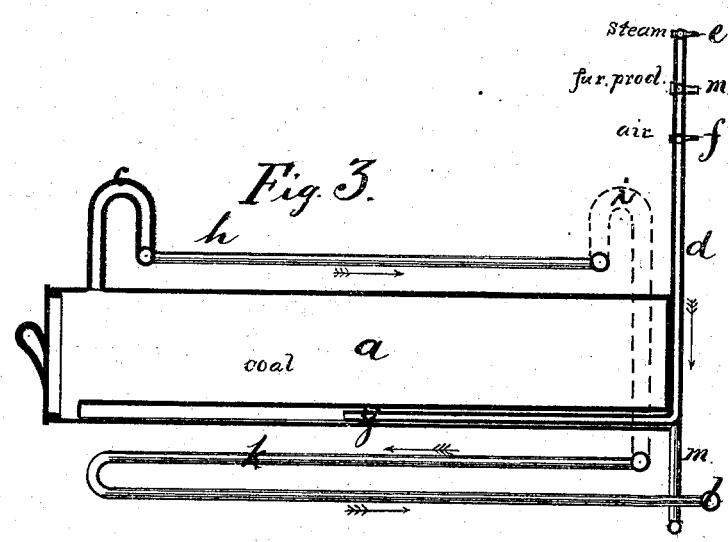
WITNESSES:
John R. Heard.
Person Noyes
INVENTOR:
Moses W. Kidder
by Alban Andrén
atty

UNITED STATES PATENT OFFICE

MOSES W. KIDDER, OF BOSTON, MASSACHUSETTS, ASSIGNOR OF ONE-HALF HIS RIGHT TO PERSON NOYES, OF SAME PLACE.

IMPROVEMENT IN PROCESSES FOR MANUFACTURING COAL-GAS.

Specification forming part of Letters Patent No. 173,730, dated February 22, 1876; application filed August 27, 1874.

*To all whom it may concern:*

Be it known that I, MOSES W. KIDDER, of Boston, in the county of Suffolk and State of Massachusetts, have invented certain new and useful Improvements in Process for Manufacturing Illuminating-Gas; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to and consists of a new and improved process of manufacturing gas for illuminating purposes by means of atmospheric air, steam, and the mingled gases as produced by the furnace-fire beneath a gas-retort, or from fuel in a state of combustion, and containing carbonic acid and nitrogen, beneath and through the ignited and burning coal in a gas-retort, from which I obtain a mixture of carbonic oxide, hydrogen, and nitrogen gases; then by passing such mixed gas from the retort into and through highly-heated pipes, and by introducing into such pipes, with the said mixed gases, gas-producing hydrocarbon, such as crude petroleum, or rosin in a melted state, and by mixing and combining the volatilized products of the hydrocarbon with the mixed gases, thus producing illuminating-gas, which is permanently combined and made fixed gas by passing the whole or last-named combined mixture through pipes heated to or nearly to a white heat, and from such highly-heated pipes to and through purifiers and to a gas-holder.

To better explain my said improved process I herewith annex certain drawings, representing the apparatus which I use for generating gas for illuminating purposes.

In the said drawings, Figure 1 represents a plan; Fig. 2, a side elevation; Fig. 3, a longitudinal vertical section, and Fig. 4 a rear end view.

A represents an ordinary gas-retort, having a furnace beneath, around and above, it in the usual way. Within and resting upon the bottom of the retort I place a conduit or inverted trough, so constructed as to admit of the passage of gas, air, or steam beneath its edges. In the space beneath this trough the air, the steam, and the mixed gases from the furnace are introduced through a pipe or pipes, $d\ g$, provided with branch pipes $f$, $m$, and $e$, each having suitable valves or stop-cocks, by which to admit, to regulate, and to stop the flow of either, any, or all the said substances which are introduced through said pipe or pipes $d\ g$.

Above and at each end of the retort are curved pipes $c$ and $i$, and these pipes are connected by pipes $h\ h$ by means of branch T's at the junction of said pipes. The curved pipe $c$ leads from the interior of the retort to one of the branch T's, and the curved pipe $i$ leads from the second branch T to a third branch T at the junction of the pipes $k\ k$, forming the coil immediately above the fire and beneath the retort. A delivery-pipe, $l$, connects with a branch T at one end of the coil, and through this pipe $l$ the fixed gas is conveyed from the apparatus.

To manufacture gas by my improved process I proceed as follows: I first charge the retort with coal above the inverted trough or conduit, and close the retort. I next charge the furnace beneath the retort with fuel, and fire the same in the usual way. When the bottom of the retort has become heated to redness, I then admit air through the pipe $f$ and pipes $d\ g$, to the space beneath the conduit, from which space the air escapes beneath each edge of the conduit in a thin stratum, passing under and up through the coal. The coal nearest the bottom of the retort, then being in a state of ignition and burning, is converted into carbonic oxide by the oxygen of the air admitted.

After a considerable portion of the coal in the retort has become ignited, I shut off a portion or the whole of the current of air, and open a cock, $m'$, in pipes $m$, and admit the mingled gases from the furnace beneath the retort through the pipe $m$ and the pipes $d\ g$. The carbonic acid in this mingled gas from the furnace, coming in contact with the ignited carbon, is reduced to carbonic-oxide gas by a portion of its oxygen uniting with the ignited carbon in the retort. At this stage of the process I open a third cock, $e'$, in the pipe $e$, and admit steam to the space beneath the conduit in connection with the said mingled gases or air, or both.

The steam when coming in contact with the ignited carbon is decomposed, its oxygen combining with the carbon forms carbonic oxide, and its hydrogen is set free, and this completes the first stage or step of the process, and its production is combustible gas suitable for heating purposes.

The illuminating property is conferred or added by the second step or part of the process, and by the introduction of the illuminating element, which is crude petroleum, or rosin in a melted state, or other gas-producing hydrocarbons, either of which are introduced through a branch T, or near the junction of the curved pipe $c$ with the series of horizontal pipes $h$, and through the last-named pipes, which are sufficiently heated by the fire in the furnace, which extends around and above the retort, and forms a space for the pipes $h$ and the pipe $i$, which receives the hydrocarbon from the pipes $h$ through a branch T, at the junction of the two last-named pipes. While passing through the pipes $h$ the hydrocarbon is volatilized and mixed or incorporated with the gases produced in the retort by the first part of the process, and conveyed through the pipe $c$ and the branch T to the pipes $h$, while the hydrocarbon is introduced therein.

This mixture of hydrocarbon vapors and the gases from the retort are passed through the branch T and the connected pipe $i$, thence to and through a third branch T, and into the pipes $k$, forming the coil, which coil-pipes are heated to, or nearly to, a white heat. In passing through these highly-heated pipes $k$ the combination of gases and hydrocarbon vapors are permanently united, resulting in fixed and incondensable illuminating-gas. From this point the fixed gas is conveyed through the pipe $l$, and through purifiers to a gas-holder, from which it is drawn in the usual way.

In generating the mixed gases, as by the first part or step of my improved process, the air is admitted in greater or less quantity, to increase and to regulate the combustion of the coal above the conduit, the result of which combination is carbonic oxide, and as I desire to obtain the hydrogen from the steam, and the carbonic oxide from the mixed gases, I shut off a portion or the whole of the supply of air, when it is not positively demanded, and depend upon the oxygen of the steam, and a part of the oxyen of the carbonic acid to support combustion of the coal in the retort, and the supply and proportions of the steam and the acid is also varied, as the temperature in the retort is greater or less, as it requires a higher temperature to decompose steam than to reduce carbonic acid to carbonic oxide.

The advantage derived by introducing the mixed gases into the retort instead of air, or with a small quantity of air, is that the coal in the retort is consumed much slower by the gases than by the air; it is, therefore, a matter of economy, and besides this, the quantity of carbonic oxide produced by the said gases is double that produced by air.

The advantage derived by the steam introduced is the obtaining of the hydrogen it contains, which is always preferable to carbonic oxide in illuminating-gas, so far as it may be obtained from this source; but as it is very difficult to keep the temperature of the coal in the retort sufficiently high, by heat applied upon the outside, to decompose steam in any great quantity without destroying the apparatus, but a limited quantity of steam can be used, except by introducing air, as described, in connection with or preceding the steam, when a much larger volume of steam is used.

When gas is wanted for heating purposes only, I shut off the hydrocarbon, and draw the carbonic-oxide gas and hydrogen from the retort as it is generated by the first part of the process.

I claim as my invention—

The process, substantially as herein described, of manufacturing fixed illuminating-gas by introducing air, steam, and the specified mingled gases produced from fuel in a state of combustion, introduced beneath and passing them upward through ignited and burning coal in a gas-retort, heated from the outside, and combining the products of the steam, air, and specified gases, being products of fuel-combustion, with the products of the ignited coal in the retort; then by passing the combined elements produced by the air, steam, gases, and coal from the retort into and through highly-heated pipes, and introducing a gas-producing hydrocarbon into such pipes, and there combining the volatilized products of the hydrocarbon with such mixed gases; then by passing the whole combined mixture through pipes at or near a white heat and varying the supply and proportions of the gas-making elements as may be desired, all substantially as described.

In testimony that I claim the foregoing as my own, I have affixed my signature in presence of two witnesses.

MOSES W. KIDDER.

Witnesses:
ALBAN ANDRÉN,
PERSON NOYES.